A. H. SHOCK.
AUTOMATICALLY COMPUTING WEIGHING SCALE.
APPLICATION FILED SEPT. 27, 1909.
1,005,337.
Patented Oct. 10, 1911.
2 SHEETS—SHEET 1.
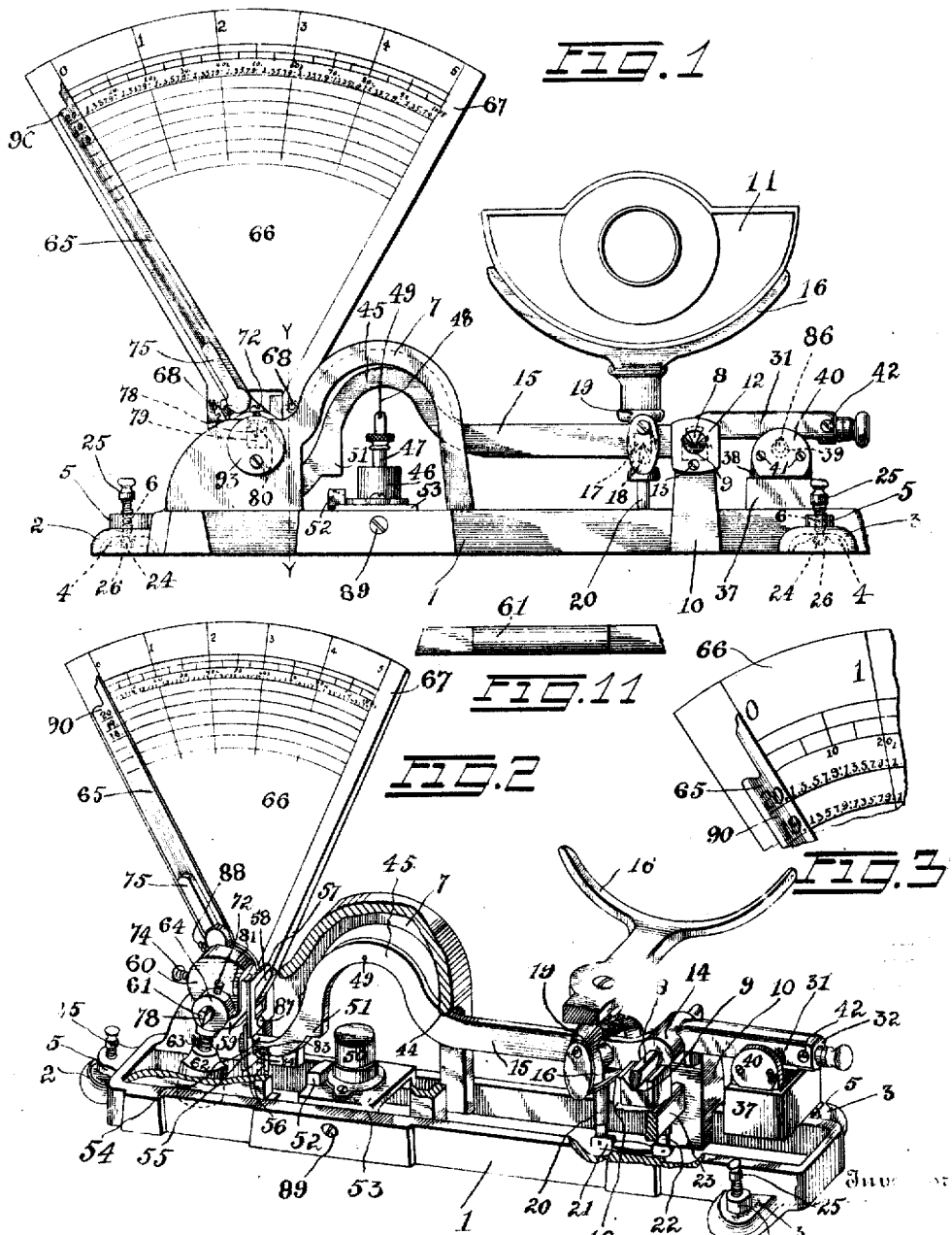

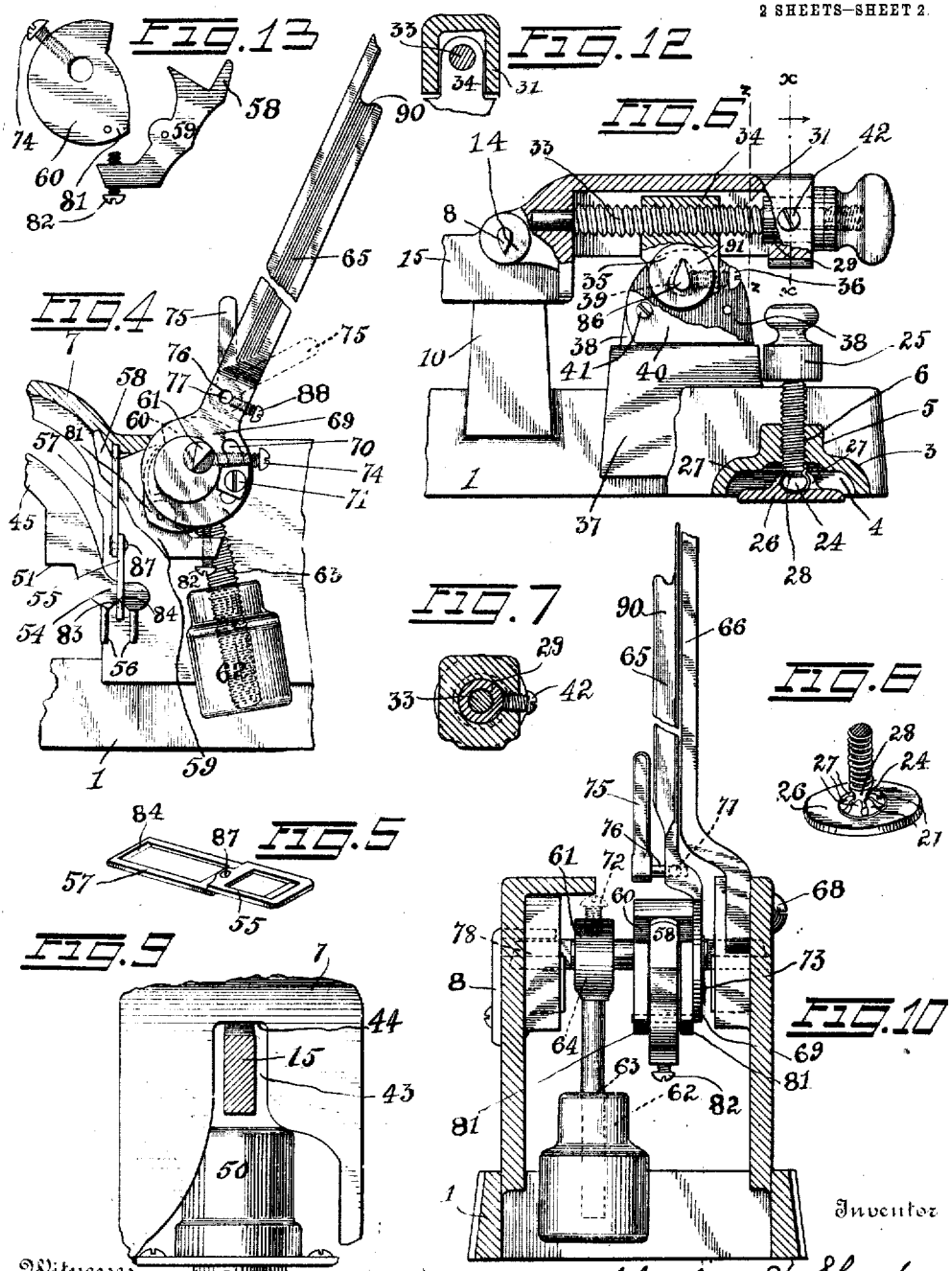

UNITED STATES PATENT OFFICE.

ABRAHAM H. SHOCK, OF LANCASTER, PENNSYLVANIA.

AUTOMATICALLY-COMPUTING WEIGHING-SCALE.

1,005,337.  Specification of Letters Patent.  Patented Oct. 10, 1911.

Application filed September 27, 1909. Serial No. 519,676.

*To all whom it may concern:*

Be it known that I, ABRAHAM H. SHOCK, a citizen of the United States, residing at Lancaster, in the county of Lancaster and State of Pennsylvania, have invented certain new and useful Improvements in Automatically - Computing Weighing - Scales; and I do hereby declare the following to be a full, clear, and exact description of the invention, such as will enable others skilled in the art to which it appertains to make and use the same.

This invention relates to automatically computing weighing scales using adjustable weights and having flexible connection between the scale beam and index shaft.

The said invention consists in certain improvements in the means for attaching and adjusting the weight carried by the short arm of the scale beam; in certain improvements in the connecting devices between the scale beam and index shaft; in certain means for adjustably mounting the index on said shaft and connecting it with an eccentric adjustable block or cylinder section mounted thereon to adapt the index to dials having different spaces in series; in certain devices for relatively adjusting the said index and weight also mounted on said shaft to obtain the most satisfactory action of the two in combination; in certain adjustable means for weighting the index to insure its proper return to zero without changing the adjustment of any other parts; in certain details of connection between the scale beam and the double link and the construction and adjustment of the horn on which said double link is hung from the eccentric block on said index shaft and in certain other details and features of construction, combination and arrangement all as hereinafter more particularly set forth and claimed.

In the accompanying drawings, Figure 1 represents a detail side elevation of a computing scale embodying my invention; Fig. 2 represents a perspective view of the same, parts of the frame and arch being broken away; Fig. 3 represents a detail enlarged view of parts of the dial and index; Fig. 4 represents an enlarged detail view in side elevation of the index its shaft accompanying devices and connecting links, connecting said devices and the scale-beam; Fig. 5 represents an enlarged perspective view of the link for connecting the horn 58 and the projection 54; Fig. 6 represents an enlarged view in side elevation of the weight on the short arm of the scale beam, its adjusting means and means for adjusting one side of the rear end of the machine; Fig. 7 represents a sectional view on the line $x$—$x$ of Fig. 6; Fig. 8 represents an enlarged perspective view of the plate 26 and its screw; Fig. 9 represents an enlarged view of the scale-beam guide-way and the dash pot covered; Fig. 10 represents a sectional view on the line $y$—$y$ of Fig. 1, on an enlarged scale; Fig. 11 represents a side view of the index shaft; Fig. 12 represents a sectional view on the line $z$—$z$ of Fig. 6; and Fig. 13 represents an enlarged detail view of the index shaft cylinder and horn piece 58, said parts being separated.

1 designates the base or base-frame having a forwardly extending flat lug 2 at one end and two similar laterally extending lugs 3 on opposite sides of the other end of said base frame. Each of these lugs has a broad recess 4 in its underside communicating with the interior of a short hollow post 5 raised on said frame, the top of which post is centrally screw-tapped at 6. Said base frame is preferably an elongated rectangular parallelogram in form, cast in one piece with said lugs and post and with a raised arched frame 7 for supporting the index shaft and other parts and guiding and limiting the motion of the scale-beam 15 as hereinafter described. The said scale-beam is mounted by downwardly presented knife-edge pivots consisting of the terminal parts of a bar 8 having the knife edge running its length in bearing blocks 9, which have V-shaped recesses on top to receive said pivots and are held in the tops of standards 10, the lower ends of which are rigid with the side bars of said bed frame, being preferably bifurcated to straddle the same and securely fastened thereto or cast therewith. A pair of removable sheet metal caps 12, attached to said standards by screws 13 cover and protect the said pivots and bearing blocks. A cylindrical block of metal 14, rigid with the scale beam 15 and inclosing the middle part of knife edge pivot bar 8, is located between the upper ends of standards 10 and serves by contact therewith as a stop to prevent the lateral movement of the scale-beam at this point in either direction and keep the knife edges of the pivots exactly in place in the V-shaped bearing recesses. Said pivot bar bearings, cap and block are similar in general construction and operation to those set forth in my application No. 492,627. Other devices common to said prior application are the means of support for the scale pan or scoop 11 comprising a yoke 16 composed of an upper section and a lower section detachably secured together, bearing blocks 17 held in said yoke and having downwardly presented V-shaped recesses, which fit on the upwardly presented knife edge pivots, these being the terminal parts of a pivot bar 18, similar to pivot bar 8 above described, but held in reverse position by its covering block 19 corresponding to block 4 aforesaid rigid with scale beam 15.

A rod 20 extends from the middle of the lower section of yoke 16 down to a link rod 21 pivotally connected as usual to a depending rod 22 rigid with a cross-bar 23 connecting the lower parts of standard 10, this rod 22 being therefore directly under the central point of the pivot bar 8, which is the fulcrum of the scale-beam. Any convenient form of scale beam or scoop may be used.

The screw-threaded holes 6 in the tops of posts 5 above mentioned receive and engage upright adjusting screws 25 which are connected at their lower ends by ball and socket joints to metallic base-disks 26 fitting into recesses 4 in the bottom of lugs 2 and 3. These disks rest on the table or other support of the bed frame 1 and by turning the screws any inequality in the surface may be compensated for, keeping said frame and index shaft horizontal, the index and dial vertical and the movements of the scale-beam in a vertical plane. The said ball and socket joints allow the screws 25 to retain a vertical position during and after the act of adjustment and also allow the disks 26 to easily adjust themselves to the slope of the surface. Unless such surface be horizontal the end or corner of the base frame 1 raised by such adjustment will of course be supported by the screw affecting the same and its base-disk without quite touching the table or other support. Each ball and socket joint is most conveniently formed as shown by making a rounded knob or ball 24 on the lower end of the screw and providing the disk with a series of inclosing tongues 27 which are bent over the same to form a socket. When these parts are to be separated for the entire separation of the screw and disk from the bed-plate or for any other purpose, the said disk must be lowered by the action of the screw quite below the lug 3 or 4, and the said tongues may then be bent open to free the said knob or ball. The latter may be of the same diameter as that of the screw itself, or slightly less, being formed by making a groove 28 for the reception of the tongues 27 just above its lower end, and merely rounding off the latter to the requisite convexity, with slight reduction of diameter. It will then readily pass up through the hole 6 after being separated from the base disk 26.

The short end of the scale beam is provided with an integral elongated guide way 31, having approximately the shape of an inverted U in cross-section. Its closed outer end is perforated at 32 for receiving the shank of an adjusting screw 33 having its head outside of said guideway and engaging a nut 34 which slides within the latter. This nut has a cylinder or cylindrical block 35 hung to its underside, said block inclosing the middle part of a knife edge bar 86 clamped therein by a set screw 86 which permits the said bar to be adjusted lengthwise so as to secure the proper length of pivot on each side and prevent undue strain on either end. The terminal parts of this bar constitute knife-edge pivots, having their ends presented upward; and on these a weight 37 is hung by means of raised bearing lugs 38 of said weight which are provided with openings 39 for said pivots having inverted V-shaped upper ends. The ends of said pivot rods and the outer faces of the said bearing lugs proximate thereto including said openings are covered by flat plates or shields 40, detachably secured to said lugs by screws 41. A small set screw 42 when turned through the side of guideway 31 near the outer end thereof, bears against a sleeve 29 on the said adjusting screw 32 and locks the said sleeve, thereby holding the screw 33 against entire withdrawal from said guideway.

By means of the adjusting screw 32 and the weight 37, the leverage of the latter may readily be varied at will, to compensate for any defect in the mechanism, such as will often elude the sharpest scrutiny, or may be caused at any time by accident or changes in temperature. It enables the operator to set the index at the proper point with precise accuracy; also to use the scale-beam for weighing, at will, greater or less amounts by the same degree of vibration, using differently graduated dials in accord with such changes. By freely suspending the weight on the small arm of the scale beam instead of making it rigid with the nut or other screw threaded part engaging the screw 32 I keep it always vertical so that its action on the scale beam is varied only by the shifting as above to points farther from or nearer to the scale beam fulcrum, without any irregularity or uncertainty due to a change in the inclination of this weight as the scale beam tilts up or down. This weight is made heavy to assist in weighing as well as in setting the index, though the latter function has hitherto been the chief, if not the exclusive one of weights adjustable by screws on the short arms of scale beams. This increase of weight makes great delicacy of adjustment and poise very important and the knife edge bearings are helpful therein. The knife edge pivots are on the end of an enlarged cylindrical middle part 91 which by contact with the bearings keeps the pivots from sliding laterally, over the latter, and avoids strain.

The long arm of the scale beam 15 moves up and down in an upwardly tapering opening 43 in the front wall of the arched frame 7 before mentioned; being guided by the upper parts of the sides of said opening and prevented from rising above a certain point by the squared upper end 44 of said opening, which serves as an upper stop for said scale beam. To this point the said arm is straight, being also on a slightly lower horizontal plane than the short arm of said beam but between the opening 43 and the operating of said beam the said long arm is arched upward at 45, leaving under it space for a dash pot 46, the piston 47 of which is hung by a link 48 from a hole 49 in the middle and highest part of said arched portion. When the scale is not in use and especially in shipping it from one point to another the said link may be disconnected, the piston allowed to descend to the bottom of the dash pot and the latter covered by a tightly fitting cap 50 to prevent the oil from splashing out. This dash pot has its usual function of cushioning the downstroke of the long arm of the scale-beam, which stroke is stopped at a certain point by the contact of a shoulder 51 on the downwardly bent portion of said arched part of the long arm of the scale-beam with a stop-block 52 fixed on a transverse platform 53, said platform resting on and being fixed by a screw 89 to the side bars of the bed-frame 1 and serving to support also the dash pot aforesaid. The operating end of said scale beam is provided with a finger 54, which extends through the opening in a stirrup or link 55, also with two parallel prongs 56, extending downward from said finger and straddling the bottom bar of said stirrup, these being of sufficient length with relation to that of the central opening of said stirrup or frame, which is closed at the top to prevent the accidental disengagement of said finger from said stirrup. The top bar of the latter is pivoted in its middle at 87 to an upper stirrup or frame 57 for lateral play, this upper stirrup being hung on the upwardly projecting curved horn 58 of a curved bar or yoke 59 attached to a block in the form of a cylinder section or half drum 60 mounted on the index shaft 61, so that said shaft, block and bar all move together, as drawn down by the depression of the operating end of the scale beam, or by the counterbalancing and replacing action of a weight 62, which is adjustable toward or from said block radially on a screw threaded rod or stem 63 of a collar 64 clamped on said shaft, so as to vary the leverage and effect of said weight. The latter acts always in opposition to the depression of the long arm of the scale beam and balances the material weighed thereon, being aided therein by the action of the weight before described on the short arm of the scale-beam, these two weights sufficing for the weighing and for all regulation of the index and other parts except as hereinafter stated, and enabling me to dispose with additional weights carried on or attached to the scale beam. The stirrups or frames 55 and 57 together constitute a flexible double-link allowing sufficient lateral play at both ends and in the middle to prevent binding, as the openings in said frames are wider than the parts which they receive and said double-link connection is flexible in its pivot 87 at a point between its ends. This is important, as the scale beam, after much use or even without it, will sometimes fail to work perfectly true in vertical vibration. The upper frame or stirrup 57 is made longer than the lower one to provide sufficient length of opening to allow for the movement of the horn 58 which is necessarily rather large, that it may have the necessary strength and which protrudes in different degrees through such opening in its different positions. The outer or under side of said horn is curved or rounded to avoid impeding contact with said link as the operating end of the scale beam ascends. The bar or yoke 59 is set between guide flanges 81 of the recessed side of the block or cylinder 60 and adjustable longitudinally in the groove or guideway thus formed so as to be acted on through said stirrups 55 and 57 and horn 58 by the depression of the operating end of said scale beam at any chosen point of descent of said operating end, within certain limits, approximately fixed by the upper and lower stops for said scale beam above described. A set screw 82 (Fig. 4) working through a part of said bar against said block is used in this adjustment and holds said horn in a position of greater or less height and protrusion in the normal or first position of the parts. The terminal finger 54 of the operating end of the scale beam is provided with an inverted V-shaped recess 83 on its under side which fits on a knife edge 84 in the upper side of the under bar of the lower link frame or stirrup 55 of said double link, this knife edge engagement insuring greater accuracy of vertical action of the scale beam on the said horn and index shaft and lessening the friction. The relative arrangement of this edge and recess may obviously be reversed. The said double link answers the purpose of a cord or chain in transmitting to the index shaft the downward movement of the operating end of the scale beam, but not transmitting the upward motion of said scale beam and it is much more durable and easily detachable means of connection than either of these devices, though abundantly guarded by the construction of the parts against uncoupling accidentally and inexpensive to manufacture. In separation, it is first removed from the horn 58 and then from the finger 54 without difficulty.

The index 65 moves over the face of a segmental dial 66 on a sector-form frame 67, the lower end of which is detachably fastened at 68 to one side wall of the frame 7 aforesaid. Index 65 is provided at its lower end with a disk-form plate 69 mounted for axial adjustment on the cylindrical middle part of the rocking index shaft 61, said plate and index shaft being clamped in any desired position of such adjustment by a screw 71 passing into the proximate face of block 60 through a curved slot 70 of said plate 69. Thus the index may be adjusted to secure exact accuracy of position at the zero point of the dial when starting, without turning the said block at all or affecting the position of any other part. The words axial adjustment are used in this specification in the sense of adjustment around the axis. After being thus adjusted in position (and after the other adjustments hereinafter described have been duly made) the said block 60 and plate 69 move as one piece with the oscillation of the index shaft carrying the index over the face of the dial. Said block is, however, mounted eccentrically on the cylindrical middle part of the said shaft 61 shown in detail in Fig. 11, the said block being adjustable around said shaft and fastened at will in any position of such adjustability by a set screw 74 in order that the greatest diameter of the said block or cylinder section 60 may be turned, more or less to any chosen degree, in the direction of indicating the greater numbers. Such adjustment of course regulates the degree of increase of sweep of the index as it approaches the end of the dial where the numbers indicating greatest weight and number appear and thus will allow the substitution of dials or dial cards having greater or less spaces at this end according to the preferences of different persons. The collar aforesaid from which the screw-threaded stem carrying the weight 62 extends radially is also mounted for axial adjustment on the cylindrical middle part of the rocking index shaft 61, a set screw 72 being used to clamp it in any position of such adjustment. By this and the means above described for similarly adjusting the position of the index forward or backward on said shaft, the relative positions of said index and weight with regard to said shaft may obviously be greatly varied. It is best as the index advances to have the weight decidedly on the side of the shaft opposed to that to which the index inclines, in order that the replacement of the index at zero may be prompt and reliable when the article weighed is lifted from the scale pan or scoop, but at starting it is also best that the forward movement of the index should not be impeded by the weight. By the mounting of said index and weight above described and the application as explained of the set screws it is easy to effect an arrangement combining these advantages or to vary the same in such manner and degree as the special circumstances may require.

It sometimes happens that an index which moves forward with perfect accuracy to the end of the dial will not return to its original position as accurately and sometimes the cause of this irregularity cannot be determined after much investigation. It therefore becomes important to provide means for aiding such return without changing the limit of forward motion or interfering with the adjustments already described. It is also necessary to make such additional compensating means adjustable, in order that the degree of its action may be varied in accordance with the requirements of the case. To these ends I attach pivotally to the lower part of the index a short heavy arm or long weight 75 and provide an adjusting screw 88 which turns through the side of said index into contact with the lateral pivot 76 of said arm or weight which is set rotatably into a recess 77 in the face of said index in order that the position of said arm or long weight may be adjusted to incline either way in greater or less degree accordingly shifting the center of gravity of the index.

The index shaft 61 has its terminal parts formed into knife edge pivots 78, resting in bearings 79 which are provided with broad V-shaped recesses 80 in their upper faces, and are held in the recessed and raised parts of the side walls of frame 7 aforesaid. Caps 93, detachably secured to said walls, cover said bearings and pivots. The V-shaped recesses 80 are of sufficient breadth to permit the said knife edge pivots 78 to rock backward and forward in them with the oscillation of index shaft 61 under the alternating action of the scale beam 15 and the counterbalance weight 62. The initial position of the knife edges is against the inclined side of the bearing recesses in the direction of zero on the dial and corresponds to the zero position of the index. The other inclined face limits the extreme throw of the index. These faces correspond in function to the stops for the scale beam.

Hitherto in computing scales it has been most common to read the indications at the rear edge of the index, that is to say at the edge toward the lower figures from a line carried thereby and just behind the same. As the operator commonly stands near the scale and often cannot see these figures distinctly enough to readily distinguish them from the neighboring ones without bending over inconveniently, it becomes important to devise a remedy. To this end I make the index in the form of a rather broad blade inclined at 90 from the front edge to the rear edge out from the dial so as to constitute a shield effectually hiding the figures over which it has already passed on the dial, it being understood that the figures next in front of the index and close to its edge are to be read to show the weight and total price, the latter being found in the horizontal column of the dial corresponding with that marked by the price per pound (or ounce or other unit of weight) as marked e. g. 18, 19, 20 in vertical series on the inclined face of the index blade. The broad row of graduated spaces at the top of the dial is marked to indicate such units of weight. The row next below consists of numerals alternating with dots as 1, 3 5., &c, space being economized by omitting the alternating numbers and repeating the same series from 10 to 20 and so on. To provide for similar calculation in the case of half cent charges per pound as 18½ cts., 19½, &c., the numbers on the dial have an extra series arranged above them at intervals as shown with dots and numerals alternating as exponents and the half cents are marked also on the index blade in position corresponding to such interlined series. The axial adjustment of the index already explained serves also to correct any inaccuracy of its position and the position of the appropriate figures on it with regard to those on the dial. This dial, thus graduated, is presented only as a form and arrangement of characters preferred in certain instances and for certain purposes, but not at all as limiting the operative parts of the weighing scale to use therewith. As already explained the index and the parts rocking the same forward under the action of the material weighed may be used with a great variety of dials having different lengths and arrangement of spaces, also of course with different series of numerals or other characters to indicate such spaces or the division lines between them; and of course this is equally true of the means for replacing the index in its original position when the material weighed has been removed from the scale; and of the adjusting and other incidental devices employed.

Adjusting either of the pendulum weights 37 or 62, as before stated, will of course vary correspondingly the amount indicated as weighed thereby thus effecting convenient means of correcting any inaccuracy of indication and of adapting the machine to deal with larger or smaller quantities. The endwise adjustment of the knife-edge bar supporting weight 37 enables me to make sure of the proper position of its pivots and equality of strain and wear thereon.

The operation has been explained in detail in describing the machine. The weight depresses the long arm of the scale-beam, which draws down on the double links and horn 58 rocking the shaft and index and moving the latter over the dial from zero toward increasing numbers. When the depression has caused the increasing leverage of weight 62, aided in a measure by the weight on the short arm of the scale beam, to balance the material weighed the index is stationary and shows on the dial the weight and its price as stated. When the material weighed is removed from the scoop or pan the free end of the lever rises without affecting or being impeded by the index shaft and connected devices and without any strain; and said shaft is returned to its former position independently by the action of weight 62, the effect of which for this purpose as well as for the weighing is easily regulated by adjusting said weight on its screw threaded stem or rod.

After the material weighed has ceased its action, the weight 37 on the short arm of the scale beam is used only to replace the scale beam in its first position; is not aided by any other weight therein and is not counterbalanced by any other part. Similarly the weight 62 on the index shaft is then used merely to replace the said shaft, the index and the described attachments in their first position, without being called on to lift any of the weight of the scale beam. Thus the scale beam is provided with two pendulum weights coöperating by their action on its respective arms as counterbalances for the material or article weighed, but ceasing their coöperation as soon as said material or article is removed, these pendulum weights then acting independently of each other as replacing devices only, the one for the scale beam alone, the other for the index shaft and its attachments but not for the scale beam.

Having thus described my invention, what I claim as new and desire to secure by Letters Patent is:

1. In combination with the scale beam and index shaft of a weighing scale and a flexible connection between these parts, a pendulum counterbalance weight acting on said index shaft, means connecting said weight to said shaft, a coöperating pendulum counterbalance weight acting on the short arm of the scale beam, a longitudinally adjusting screw mounted in the short arm of said scale beam, a nut traveling thereon, laterally extending pivots moving with said nut and parts connected to said weight and arranged to engage and be suspended by said pivots, these parts and pivots providing knife edge pivotal means of suspension for said weight substantially as set forth.

2. In combination with a scale beam having a guideway formed on its shorter arm, a nut traveling in said guideway, a screw engaging said nut for adjusting the latter longitudinally of said arm in said guideway, a cylinder or block suspended from said nut and knife edge pivots at the ends of said cylinder or block, a weight provided with suitably recessed bearing plates hung pivotally on said knife edges substantially as set forth.

3. In combination with a scale beam, a cylinder or block hung therefrom, a pivot bar adjustable through the same and providing knife edge pivots by its protruding terminal parts, means for clamping said bar in any position of such adjustment to guard against any inequality of strain on said pivots and a weight hung pivotally on said knife edges substantially as set forth.

4. In combination with a scale beam, a cylinder or block hung therefrom, a pivot bar adjustable through the same and having protruding ends which constitute knife edge pivots, a weight hung pivotally on said pivots and a screw through a part of said cylinder to fasten said bar in any position of such adjustment for the purpose set forth.

5. A weight pivotally suspended by two raised plates forming parts thereof and provided with openings having inverted V-shaped parts at their tops, a bar provided at its ends with weight supporting knife edge pivots received by said openings, a part surrounding the middle portion of said pivot bar and permitting its endwise independent adjustment, means for clamping said bar in any position of such adjustment, a scale beam and means for suspending therefrom said part, pivot bar and weight.

6. A pivot bar having a knife edge along its upper side from end to end fitting its terminal parts for use as supporting knife edge pivots, in combination with a weight provided with parts whereby it is hung pivotally on said pivots, a scale beam, means suspended from said scale beam allowing the endwise adjustment of said knife edge bar for equalizing the strain on said pivots and protective plates covering the ends of said pivots and the openings which receive them, the said plates being detachably fastened to said weight substantially as set forth.

7. In combination with a scale beam having a long and a short arm, a part supported by said short arm and adjustable along the same, means for thus adjusting this part, means for locking it at any point of such adjustment, a weight hung from said part, laterally projecting knife edge pivots carried by said part attached to said weight and resting on pivots for suspending said weight substantially as set forth.

8. A scale beam having a long and a short arm and provided with a longitudinal guideway on its short arm, a perforated end for said guideway, a nut working in said guideway, a screw working through said end and engaging said nut for such adjustment, a weight pivotally suspended from said nut, laterally extending knife edge pivots carried by said nut, bearings fitting on said pivots for suspending said weight and a clamp screw engaging said adjusting screw to lock said nut and weight in any position of such adjustment.

9. The base of a weighing machine having at its ends rigid flat lugs recessed on their undersides, which are provided with raised short hollow posts communicating with the recesses of said lugs and screw-tapped on top, in combination with adjusting screws engaging the screw threaded holes of said posts, base plates for said screws fitting within said recesses and ball and socket joints connecting said base plates and screws substantially as set forth.

10. A scale beam having a long and a short arm, said long arm being straight from the fulcrum for a part of its length, then arched for another part of its length and finally bent downward to its operating end and being provided with a shoulder at or near the lowest portion of said arched part, a fixed stop arranged for contact with said shoulder at the limit of the greatest permissible descent of said operating end, a stop for the upward movement of said long arm, a rocking index shaft and flexible means of connection between said shaft and scale beam whereby said index shaft is rocked in one direction by the depression of said long arm until this motion ceases by the complete counterbalancing of the article weighed or by the contact of said shoulder with the stop below it, the said rock shaft not being lifted by said scale beam while the said long arm of the latter ascends and the said upper and lower stops being distinct from, and unconnected to, each other.

11. In combination with an upright weighing scale index, having a stem, an arm serving as an elongated weight pivoted to the stem of said index for adjustment to various positions of inclination and thereby shifting the center of gravity of said index and a set screw operating to clamp said arm or weight in any one of these positions for the purpose set forth.

12. In combination with a weighing-scale indicating device having a stem, a counterbalance weight pivoted to said stem and means acting on said weight only to hold it in the position to which it has been adjusted and thus regulate its position and counterbalancing effect.

13. A weighing scale index consisting of a blade inclined outward and rearward from its forward edge in the direction of motion in order that the figures on the dial behind said forward edge may be hidden thereby substantially as set forth.

14. In combination with a dial containing a series of spaces indicating weights and a succession of series of figures and marks below the same indicating the total sums due for the respective weights and prices, an index inclined outward and rearward from its forward end in the direction of motion and having a corresponding series of prices of unit weights opposite said columns of total sums, these figures of the index and dial being adapted to the computation of fractions as well as integral numbers by inspection of the dial figures next beyond the forward end of the index opposite the proper price on the latter and under the proper weight space.

15. A weighing machine index and index shaft on which it is mounted for independent adjustment about the same, in combination with means for locking the said index after it has been adjusted forward or backward about said shaft and an adjustable pivoted attachment for shifting at will the center of gravity of said index and means for locking said attachment in any position to which it may be adjusted.

16. In combination with the rocking index shaft of a weighing scale, a part eccentrically mounted thereon to rock therewith and adjustable around said shaft and an index attached to and rocking with said eccentric part, but independently adjustable thereon around said shaft substantially as set forth.

17. In combination with the rocking index shaft of a weighing scale, a part eccentrically mounted thereon to rock therewith and adjustable around said shaft, an index moving with said part but also adjustable forward or backward on said part and means for locking said index at will in any position to which it may be adjusted.

18. In combination with the rocking index-shaft of a weighing machine, an index rocking therewith but adjustable independently to change its inclination, means connecting said index to said shaft and permitting such independent adjustment, a counterbalance weight for said shaft and index, and means connecting this weight to said shaft and permitting its adjustment around the latter to vary its position and counterbalancing action.

19. A weighing scale index having a stem, in combination with a shaft for said index, a block mounted eccentrically on said shaft, a counterbalance weight, means of attaching said weight to said shaft and means for attaching said index to said block permitting the independent adjustment of said index on the latter, the said weight and index being adapted to take positions on opposite sides of said shaft as the index moves forward.

20. A rock shaft provided with knife edge pivots, bearings supporting the latter and permitting their oscillation therein, a counterbalance weight adjustable around said shaft, means for connecting said weight to said shaft an eccentric block also adjustable around said shaft and an index attached to said block and moving therewith.

21. In combination with the index-shaft of a weighing machine, an index rocking therewith but adjustable around the same, a weight provided with means for attaching it to said shaft, and adjustable around the latter, said weight being also adjustable radially toward or from the said shaft for varying its leverage.

22. In combination with an index shaft consisting of knife-edge pivots at its ends and a middle cylindrical part, an eccentric block and a collar mounted on said middle part for independent adjustment and provided with clamping screws, a screw threaded rod or stem extending radially from said collar, a screw tapped weight adjustable on said stem and an index mounted freely on the middle part of said shaft and attached to said block by means permitting its independent adjustment.

23. In combination with a rocking index shaft, an eccentric block rocking therewith, an index provided with a disk plate mounted freely to turn on said shaft and having a curved slot formed therein and a clamping screw passing through said slot into said block for holding the said index in any position of forward or backward adjustment.

24. In combination with the index shaft of a weighing machine, a block or cylinder section rocking therewith and having flanges forming a guideway, a bar or yoke adjustable pivotally in said guideway and provided with a projecting horn, a scale beam and connections between said horn and the operating end of said scale beam.

25. In combination with the index shaft of a weighing scale, a block mounted thereon and rocking therewith, a bar provided with a projecting horn and adjustable screw and independently adjustable on said block for greater or less upward extension of said horn, a scale beam and means for connecting said scale beam with said horn.

26. In combination with the index shaft of a weighing scale, a block mounted eccentrically thereon, and adjustable at will around the said shaft, means for clamping said block in any position to which it has been thus adjusted, a part having a protruding horn and attached to said block, means for independently adjusting said part for greater or less projection of said horn, a scale beam and means for flexibly connecting said horn and scale beam.

27. In combination with the index shaft of a weighing scale, and a projecting horn rocking therewith, a scale beam and a double-link consisting of open-frames pivoted together for flexibility, the upper frame of said double link fitting over the said horn and the lower frame receiving the operating end of said scale beam.

28. In combination with the index shaft of a weighing scale and a block mounted thereon to turn therewith, a horn adjustable on said block for greater or less projection, a scale beam and double link consisting of two frames pivoted together and fitting upon the said horn and the said operating end to connect these parts.

29. In combination with a scale beam having on its operating end a finger provided with an inverted V-shaped notch on its under-side in combination with a double link consisting of two frames pivoted together, the bottom bar of the lower frame being provided with a knife edge which receives said notch, an index shaft and a projecting part rocking with said shaft and entering the upper frame of said double link substantially as set forth.

30. In combination with a scale beam having a finger projecting from its operating end, an index shaft, a projecting horn attached thereto and a device connecting said horn to said finger, said device comprising a pivoted frame which receives said finger and has knife edge contact between said finger and the bottom bar of said frame.

31. In combination with an index shaft and a horn rocking therewith, a connecting device depending from said horn and comprising in its lower part a pivoted stirrup or frame, a scale beam provided on its operating end with a finger projecting through said frame and a pair of downwardly extending prongs straddling the bottom bar of said lower frame to prevent separation substantially as set forth.

32. A double link consisting of two superposed frames pivoted together, in combination with an index shaft, a projecting horn carried thereby and having the upper frame hung thereon, a scale beam having a finger which extends through the lower frame of said double link and is provided with two downwardly projecting prongs which are on each side of the bottom bar of said lower frame and of sufficient length to prevent the accidental separation of said frame and scale beam, the said finger and lower bar having knife edge contact substantially as set forth.

33. A double link consisting of two open frames pivoted together, the upper frame being longer from top to bottom than the lower frame, in combination with a scale beam having a finger which extends through said lower frame and is guarded against detachment therefrom, an index shaft and a horn moving with said shaft and adjustable for greater or less upward protrusion through the upper frame substantially as set forth.

34. In combination with a rocking index shaft, a horn moving therewith and having its underside rounded, in combination with a scale beam and flexible means of connection between said horn and the operating end of said beam, said means comprising an elongated open frame or link hung on said horn, such rounding of the horn and elongation of the link allowing play between them without impediment as said operating end moves upward.

35. In combination with an index shaft, an eccentric block axially adjustable thereon, a bar or yoke longitudinally adjustable on said block and provided with a horn which is curved on its lower outer side, a double link consisting of two frames pivoted together, the upper frame being hung on said horn and a scale beam having on its operating end a finger extending through the lower frame substantially as set forth.

36. An index shaft having a cylindrical middle part and knife edge pivots at its ends in combination with a scale beam, broad V-shaped bearings for said pivots permitting said knife edges and shaft to rock into the extreme positions possible to the said shaft, stops for correspondingly limiting the movements of said scale beam, caps to cover said bearings and pivots, means connecting said scale beam flexibly to said shaft, and an index and counterbalance weight adjustable on said shaft, said index and weight being provided with means for attaching them to said shaft substantially as set forth.

In testimony whereof, I have signed my name to this specification in the presence of two subscribing witnesses.

ABRAHAM H. SHOCK.

Witnesses:
S. K. BITNER,
AMOS E. BURKHOLDER.